Nov. 14, 1961   C. G. BALLIETT   3,009,084
ELECTROMECHANICAL TRANSDUCER
Filed Sept. 14, 1956

INVENTOR.
Charles G. Balliett

United States Patent Office 3,009,084
Patented Nov. 14, 1961

3,009,084
ELECTROMECHANICAL TRANSDUCER
Charles G. Balliett, Rochester, N.Y., assignor to Taylor Instrument Companies, Rochester, N.Y., a corporation of New York
Filed Sept. 14, 1956, Ser. No. 609,838
10 Claims. (Cl. 317—177)

The present invention relates to improvements in electromechanical transducers of the type wherein the motion of an electrical conductor transverse to the direction of, and in, an electrical field is utilized to detect such motion, or, a current is passed through said conductor to cause such motion. Familiar examples of such devices are acoustic devices such as loudspeakers and microphones, measuring devices such as galvanometers, and other generator and/or motor devices.

The present disclosure is particularly concerned with galvanometer or loudspeaker type transducers wherein a coil of wire moves in a very small air gap in a permanent magnet circuit. Typically, such devices involve high flux densities, close tolerances, and rather critical dimensioning, if efficient, linear behaviour is to be obtained. Moreover, if adjustment of operating range is desired, as is often the case with a galvanometer type transducer, the design problem is the more complex since in addition to the variable function relation between coil and magnet, one or more additional characteristics of the magnet system may be made variable, as in the case of where the adjustment or adjustments will be made by the provision of a shunt or shunts provided for the purpose of range change or correction, or temperature compensation.

I have devised certain novel and ingenious arrangements of parts whereby range and/or temperature compensation may be effected by shunting flux from an air gap, while at the same time integrating the relevant elements of structure in such structural and functional relation as to obtain a compact, precise but simple, and foolproof arrangement very little more complex than the transducer would be if entirely uncompensated. In fact, three simple elements of structure variously provide temperature compensation, range adjustment, magnet centering and support, and magnet protection.

Figure 1:
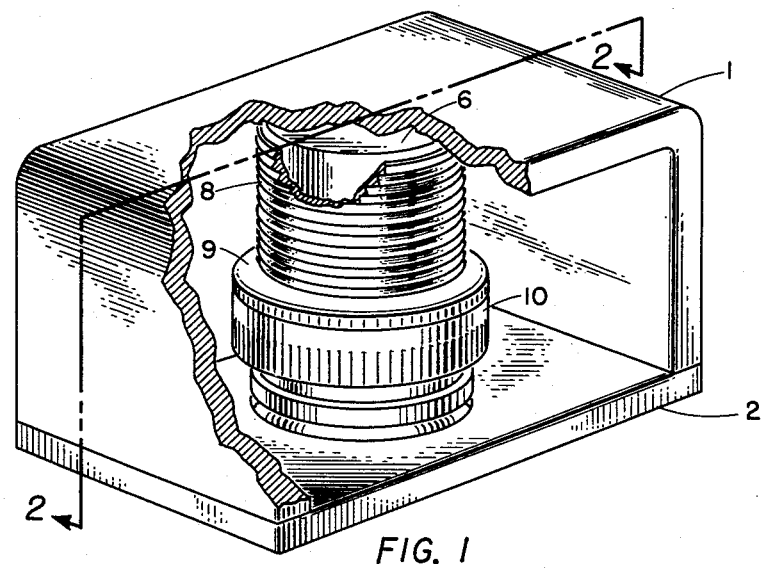
FIG. 1 is an elevation of a galvanometer type electromechanical transducer, a portion thereof being shown broken away for clarity.

In FIG. 1, U-shaped bar 1 and straight bar 2, both being elements of magnetic material, are secured together, as by screws 21, to form a substantially unitary magnetic flux conducting element, and between bar 1 and bar 2 extends a permanent magnet 6 with a soft iron or steel pole piece 7 (see FIG. 2), one end of magnet 6 being countersunk in bar 1. A threaded sleeve 8 of brass or other non-magnetic material surrounds the magnet 6, and has a threadably adjustable shunt ring 10 thereon of magnetic material, which shunt ring may be threaded up and down the sleeve to vary its distance from bar 2. While the threads on shunt ring 10 and sleeve 8 act as a detent, in that, once screwed to a given position, the shunt ring stays put due to the constraint on its motion by reason of the threads, a locking ring 9 is also provided to lock the shunt into the desired position of adjustment.

Figure 2:
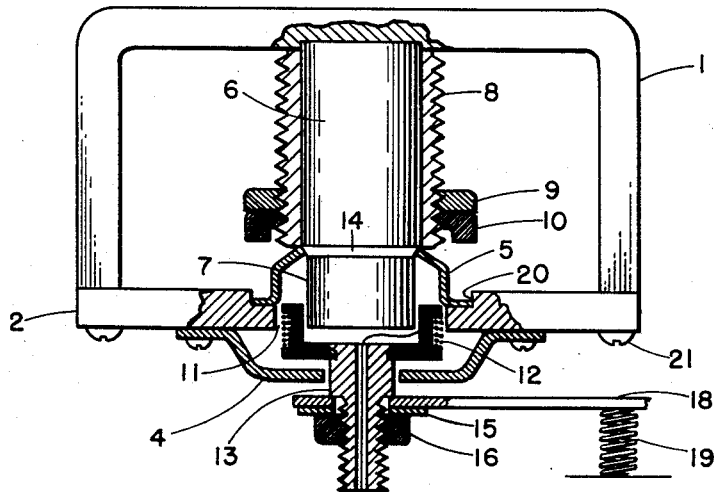
FIG. 2 shows a detailed view of the construction of the transducer according to the invention, parts being shown in section on line 2—2 of FIG. 1.

As shown in FIG. 2, the pole piece 7 extends into a hole in bar 2 to define a magnetic gap 11. In the present embodiment, hole and polepiece are so shaped as to define a circular annular gap of uniform width around the polepiece. Hence the field in the gap will be uniform around the gap. Symmetrically arranged in the gap is a coil 12 arranged to move up and down in the gap. Because of the presence of shunt ring 10, more or less magnetic flux will be diverted through the shunt depending on the distance of the shunt ring from the gap, the shunt ring being shaped so that its shunt effect is uniform around the gap. The shunt, due to its effect on the field in the gap, therefore forms a means of adjusting the intensity of the interaction of the coil and the magnetic field with respect to motion of the coil or electrical energization thereof.

The operating characteristics of a given transducer of the permanent magnet type depend on its past history of exposure to gap-flux disturbing influences. Typically, such devices are conditioned before being put into service by subjecting same to demagnetizing effects, such as mechanical jars, temperature changes and some demagnetization by an alternating current field, these effects being applied with intensities and range of variation somewhat greater than what will be reasonably expected in service. However, since sustained service operation at 150 to 200 degrees can produce a further alteration of magnetization (Alnico magnets weaken a percent or two under such conditions), in addition to conditioning, a temperature sensitive piece 5, having the additional function of keeping pole piece 7 centered in the hole in bar 2, is provided.

The piece 5 is in the form of a perforated disk of cross-section such as shown in the drawing. When the transducer is assembled, the piece 5 is slipped over the pole piece 7, and bar 2 is placed across the ends of bar 1 with the lower portion of piece 5 in a circular ledge 20 around the hole in bar 2. The piece 5 is of such height that its bottom portion abuts the ledge 20, and its top portion abuts the shoulder 14 of the pole piece before the ends of bar 2 seat on the ends of bar 1 so that when the said bar ends are forced together by drawing up screws 21 which thread into the ends of bar 1, the piece 5 stresses pole piece 7, magnet 6 and bar 1 tightly together, thus minimizing the air gaps at the meeting places of pole piece, magnet and U-shaped bar 1, and centering the pole piece with respect to the periphery of the hole in bar 2. Pole piece 7, magnet 6 and U-shaped bar 1 are arranged with surfaces mating closely to eliminate as far as possible undesired air gaps.

To obtain temperature compensation from it in addition to its support, stressing and centering functions, the piece 5 is made of material that is slightly magnetic at room temperatures but substantially non-magnetic at some higher temperature. Thus, at room temperature the flux in gap 11 is decreased slightly by the shunting effect of piece 5, but at higher temperatures, a slight increase in flux is experienced since when the piece 5 becomes non-magnetic, its shunting effect disappears, the design being such that the increase of gap flux due to the disappearance of the shunting effect offsets the decrease of flux due to the temperature weakening of the magnet 6. A material suitable for the construction of the piece is an iron alloy containing about 30% nickel such as Carpenter Temperature Compensating Alloy 30, made by the Carpenter Steel Co., Reading, Pa.

While it is desirable to provide an adjustable shunt such as ring 10, it is also desirable to construct the transducer, so that it will be exposed as little as possible to the damaging effect of tools that may be used in servicing or adjustment of the transducer or device with which transducer is used. For example, the uniformity and/or intensity of the field in the gap would suffer if a screwdriver struck the magnet causing formation of additional poles, or, if particles of material fell or were knocked into the gap, they could interfere mechanically or magnetically with operation of the transducer. However, such disadvantages are substantially eliminated in the construction I have disclosed. The air gap is closed on the one side by piece 5, and on the other side by cover 4 through a hole in which projects, with minimum clearance, coil mounting stud 13, so that as the gap 11 is practically totally enclosed, dust, metal particles, tools, etc., are effectively denied access to the gap and the parts thereof. The brass sleeve 8, on the other hand, protects the magnet itself from damage, and facilitates the use of threaded adjustment for the shunt ring.

As shown, the leads 17 of the coil are brought out through the mounting stud 13 and are connected to some device, not shown, to which it will supply electrical energy or from which it will receive such energy. The motion involved in the transduction may be taken from or imparted to a beam 18, to which is fixed, as shown, by nut 16 and washer 15, the coil mounting stud 13. If desired, motions of coil and beam can be damped, as by winding the coil 11 on a circular form of copper or other conductive material, which form will act as a shorted turn having the well-known characteristic of opposing its own motion when moved in the gap transverse to the direction of magnetic flux. Motion of the beam 18 is controlled by an elastic biasing device, here shown simply as a spring 19 attached to the beam. The spring constant is a controlling factor in the transducer operating characteristics, the exact effect of which may be adjusted by adjustment of shunt 10. Adjustment of spring constant is as a practical matter, essential, since the usual tolerances of springs are less narrow than is requisite for a precision galvanometer type transducer; moreover, spring constants are subject to change, which from time to time requires correction. While the spring itself may be adjusted directly, use of the shunt adjustment permits a wide range of fine adjustment of spring force of greater delicacy than is easily attainable with a mechanical type spring adjustment.

It will be evident that I have devised a very economical and convenient arrangement for the purpose of protecting the magnet and gap structure, while at the same time utilizing several of the same parts for temperature compensation, shunting adjustment, support and centering as well. It is, of course, possible to use the adjustable shunt without the temperature compensator, the cover 4 and the centering features since often the shunting adjustment may be the sole concern, and I do not intend to be limited in the scope of protection granted by invention by the details I have disclosed, rather the limits of such protection are to be sought in the claims I have appended to this specification.

However, it should be pointed out that all these features unite to permit attainment of the design goal of a precision annular flux gap of determinate character relatively immune from change, except when change is desired for the sake of temperature compensation and/or gap-flux adjustment.

In certain of the claims infra, I have defined the gap elements (i.e., the "magnetic elements") as parts distinct from the magnet. However, while that is literally true of the disclosed transducer, I have used the corresponding terminology in the claims merely for the sake of clarity of expression, and convenience in visualizing functional relations in the magnet circuit, and do intend that the said claims include within this scope constructions wherein magnet and gap element (i.e., pole piece 7) are one integral magnet, and similar constructions wherein at least one of what are termed in the claims as gap elements and magnet, is a magnet and the remaining entities are at least magnetic.

A full and complete disclosure having been made, whereby those skilled in the art will be enabled to successfully apply and practice my inventive teachings, the invention for which I claim the protection of U.S. Letters Patent is:

1. An electromechanical transducer comprising a bar having a circular aperture therein, a bar magnet having a circular pole piece at the end thereof, said pole piece being adjacent said aperture and so spaced therefrom as to define a uniform annular gap between the circumference of said aperture and a circumferential portion of said pole piece, an exteriorly threaded non-magnetic sleeve surrounding said bar magnet and an interiorly-threaded, uniform, annular magnetic shunt threaded on said sleeve, said shunt being advanceable toward or away from said gap by threading the shunt along the sleeve, whereby the shunting effect on said gap of the shunt may be increased or decreased as desired.

2. The transducer as defined in claim 1 wherein a second magnetic shunt is provided across said air gap, said shunt having the characteristic of being magnetic at normal temperatures and substantially non-magnetic at higher temperatures whereby to counteract any magnetization weakening effect of temperature on said magnet.

3. The transducer as defined in claim 2, wherein the second shunt is in the form of a symmetrical, centrally-perforated, circular disk, the circumferential portion of the disk adjacent the perforation being spaced along the axis of the disk from the outer circumference of the disk, the pole piece has a shoulder thereon facing in the general direction of the gap, the first-mentioned portion of the disk is seated on said shoulder with the outer circumference of the disk fixedly seated on the bar and surrounding said aperture, a second bar of magnetic material connected at its ends to the ends of the first bar, the arrangement being that the magnet and pole piece extend between the bars, the end of the magnet opposite the end having the pole piece thereon being in contact with the said second bar, said disk being of sufficient axial extent that when the bars are fastened together the said disk is compressed between the shoulder on the pole piece and the first-said bar, whereby the disk centers and holds magnet and pole piece in contact with the second bar and with each other.

4. An electromechanical transducer having a magnetic circuit, said circuit including a coil, a low-permeability portion, a bar magnet, said magnet having one end thereof adjacent said portion so that the magnetic flux of said bar magnet is transmitted through said portion, said coil having turns arranged in said portion so as to cut the lines of the said magnetic flux transmitted through said portion, a shunt constructed and arranged to divert magnetic flux from said portion in proportion to its proximity to said portion, a sleeve enveloping said bar magnet, said shunt being mounted on said sleeve and being adjustable on said sleeve toward and away from said low-permeability portion in order to vary the flux density in said portion.

5. The invention of claim 4 wherein the shunt is a flux-permeable member surrounding said sleeve.

6. An electromechanical transducer, comprising a first magnetic element and a second magnetic element, said first element being positioned adjacent one portion of said second element so as to define a path of reluctance different from the reluctance between portions of the first element adjacent said path and between portions of the second element adjacent said path, a bar magnet connected at one end thereof to said second element to supply magnetic flux via the said second element to the said path, a magnetic shunt means surrounding said bar magnet, said magnetic shunt means being mounted so as to be adjustably movable along said bar magnet toward and away from said path, whereby to define along said bar magnet a series of positions such that the shunting effect of said magnetic shunt means on the flux in said path, when said magnetic shunt means is in one of said positions, is different from the shunting effect of said magnetic shunt means on the flux in said path, when said magnetic shunt means is in any other of said positions, detent means constructed and arranged for holding said magnetic shunt means in any of said positions into which said magnetic shunt means may be moved; said detent means being exteriorly threaded means on said bar magnet, and said shunt means cooperating with threads of said threaded means so as to remain in whatever of said positions into which it is moved.

7. The invention defined in claim 6, wherein the said threaded means is a threaded sleeve means enclosing said bar magnet and the said shunt means is threaded ring means threaded on said sleeve means.

8. An electromechanical transducer, comprising a first magnetic element and a second magnetic element, said first element being positioned adjacent one portion of said second element so as to define a path of reluctance different from the reluctance between portions of the first element adjacent said path and between portions of the second element adjacent said path, a bar magnet connected at one end thereof to said second element to supply magnetic flux via the said second element to the said path, a magnetic shunt means surrounding said bar magnet, said magnetic shunt means being mounted so as to be adjustably movable along said bar magnet toward and away from said path, whereby to define along said bar magnet a series of positions such that the shunting effect of said magnetic shunt means on the flux in said path, when said magnetic shunt means is in one of said positions, is different from the shunting effect of said magnetic shunt means on the flux in said path, when said magnetic shunt means is in any other of said positions, detent means constructed and arranged for holding said magnetic shunt means in any of said positions into which said magnetic shunt means may be moved; said first magnetic element surrounding said second magnetic element so as to define a substantially uniform annular path having said different reluctance, there being a coil having turns arranged for movement in said path across lines of magnetic flux therein.

9. An electromechanical transducer, comprising a first magnetic element and a second magnetic element, said first element being positioned adjacent one portion of said second element so as to define a path of reluctance different from the reluctance between portions of the first element adjacent said path and between portions of the second element adjacent said path, a bar magnet connected at one end thereof to said second element to supply magnetic flux via the said second element to the said path, a magnetic shunt means surrounding said bar magnet, said magnetic shunt means being mounted so as to be adjustably movable along said bar magnet toward and away from said path, whereby to define along said bar magnet a series of positions such that the shunting effect of said magnetic shunt means on the flux in said path, when said magnetic shunt means is in one of said positions, is different from the shunting effect of said magnetic shunt means on the flux in said path, when said magnetic shunt means is in any other of said positions, detent means constructed and arranged for holding said magnetic shunt means in any of said positions into which said magnetic shunt means may be moved; said magnetic shunt means being a uniform annular member, and the said path having a circular contour equi-spaced from the contour of said magnetic shunt means, said bar magnet being positioned so that the spacing between said contours changes uniformly as said magnetic shunt means is moved toward or away from the said path it varies its shunting effect uniformly on each segment of said path.

10. An electromechanical transducer comprising a first magnetic element and a second magnetic element, said first element being positioned adjacent one portion of said second element so as to define a path of reluctance different from the reluctance between portions of the said first element adjacent said path and between portions of the said second element adjacent said path, a bar magnet connected at one end thereof to said second element to supply magnetic flux via the said second element to the said path, a magnetic shunt means surrounding said bar magnet, said magnetic shunt means being movable to fixed positions along said bar magnet toward and away from said path, detent means constructed and arranged for holding said magnetic shunt means in any of said positions, whereby the effect of said magnetic shunt means is adjustable; and a third element positioned adjacent said path for shunting flux from said path in addition to that flux shunted from said path by said magnetic shunt means, said third element having the characteristic of being more magnetic at one temperature but less magnetic at another temperature at which the magnetization of said bar magnet is weaker than at the said one temperature.

References Cited in the file of this patent

UNITED STATES PATENTS

| | | |
|---|---|---|
| 2,303,442 | Draper | Dec. 1, 1942 |
| 2,309,414 | Nobbs | Jan. 26, 1943 |
| 2,323,465 | Green | July 6, 1943 |
| 2,452,678 | Poole | Nov. 2, 1948 |
| 2,605,301 | Barnes | July 29, 1952 |
| 2,757,339 | Road | July 31, 1956 |